(12) United States Patent
Gustafson et al.

(10) Patent No.: US 11,015,497 B2
(45) Date of Patent: May 25, 2021

(54) CONTINUOUS RESERVOIR LEVEL MONITORING

(71) Applicant: Graco Minnesota, Inc., Minneapolis, MN (US)

(72) Inventors: Brandon T. Gustafson, Wayzata, MN (US); Suresha Saragur Nijaguna, Plymouth, MN (US); Chad G. Igo, Coon Rapids, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 336 days.

(21) Appl. No.: 16/070,671

(22) PCT Filed: Jan. 18, 2017

(86) PCT No.: PCT/US2017/013943
§ 371 (c)(1),
(2) Date: Jul. 17, 2018

(87) PCT Pub. No.: WO2017/127427
PCT Pub. Date: Jul. 27, 2017

(65) Prior Publication Data
US 2019/0024547 A1    Jan. 24, 2019

Related U.S. Application Data

(60) Provisional application No. 62/279,884, filed on Jan. 18, 2016.

(51) Int. Cl.
*F01M 11/12* (2006.01)
*F04B 49/06* (2006.01)
(Continued)

(52) U.S. Cl.
CPC ............. *F01M 11/12* (2013.01); *F04B 39/00* (2013.01); *F04B 39/0207* (2013.01);
(Continued)

(58) Field of Classification Search
CPC ........ F16N 2250/18; F16N 29/02; F16N 7/38; F04B 49/06; F04C 14/00
See application file for complete search history.

(56) References Cited

U.S. PATENT DOCUMENTS

| 4,699,250 A | 10/1987 | Hiestand |
| 5,381,874 A | 1/1995 | Hadank et al. |

(Continued)

FOREIGN PATENT DOCUMENTS

| CN | 1673709 A | 9/2005 |
| CN | 102187142 A | 9/2011 |

(Continued)

OTHER PUBLICATIONS

Second Chinese Office Action for CN Application No. 201780007187. X. dated Jun. 1, 2020, pp. 19.

(Continued)

*Primary Examiner* — Michael R Mansen
*Assistant Examiner* — Mark K Buse
(74) *Attorney, Agent, or Firm* — Kinney & Lange, P. A.

(57) ABSTRACT

The lubricant level within a reservoir is difficult to monitor, leading to the reservoir being refilled more often than necessary to ensure that the reservoir always contains lubricant. A lubricant level sensing system is connected to and monitors various aspects of the pump assembly that draws lubricant from the reservoir. The pump assembly displaces a known volume of lubricant with each pump stroke. A lubricant-level estimator calculates an estimated lubricant level remaining in the reservoir based on a stroke-count value as sensed from the pump assembly and on a reference value stored in a memory. The estimated lubricant level provides the lubricant remaining and the rate of usage such that maintenance can be scheduled ahead of time to prevent the reservoir running dry.

20 Claims, 6 Drawing Sheets

(51) Int. Cl.
*F04C 14/00* (2006.01)
*F16N 29/02* (2006.01)
*F16N 7/38* (2006.01)
*F04B 53/18* (2006.01)
*F04B 39/00* (2006.01)
*F04B 49/02* (2006.01)
*F04C 14/28* (2006.01)
*F16N 29/00* (2006.01)
*F04B 39/02* (2006.01)
*G01F 23/00* (2006.01)

(52) U.S. Cl.
CPC ............. *F04B 49/02* (2013.01); *F04B 49/06* (2013.01); *F04B 53/18* (2013.01); *F04C 14/00* (2013.01); *F04C 14/28* (2013.01); *F16N 29/00* (2013.01); *F16N 29/02* (2013.01); *F04B 2201/0201* (2013.01); *F04B 2201/0209* (2013.01); *F16N 7/385* (2013.01); *F16N 2250/18* (2013.01); *G01F 23/0061* (2013.01)

(56) References Cited

U.S. PATENT DOCUMENTS

| | | | |
|---|---|---|---|
| 5,970,942 A | 10/1999 | Koeberlein et al. | |
| 6,502,461 B2 | 1/2003 | Keller | |
| 6,601,738 B2 | 8/2003 | Weigand et al. | |
| 6,622,824 B2 | 9/2003 | Roehrborn | |
| 6,688,329 B2* | 2/2004 | Murray | G05D 9/12 116/109 |
| 7,313,956 B1 | 1/2008 | Murphy, Sr. | |
| 7,966,879 B2 | 6/2011 | Dietz et al. | |
| 8,448,750 B2* | 5/2013 | Gaugush | G01F 23/74 184/6.4 |
| 8,464,837 B2* | 6/2013 | Algulin | F16N 29/02 184/26 |
| 8,991,558 B1 | 3/2015 | Murphy, Sr. | |
| 2007/0098598 A1 | 5/2007 | Ahern et al. | |
| 2008/0302109 A1 | 12/2008 | Batenburg | |
| 2009/0032337 A1* | 2/2009 | Scott | F16N 7/38 184/26 |
| 2009/0078507 A1* | 3/2009 | Gaugush | F16N 7/385 184/6.4 |
| 2011/0253481 A1* | 10/2011 | Lin | F16N 11/08 184/108 |
| 2012/0032483 A1 | 2/2012 | Hu | |
| 2012/0132483 A1* | 5/2012 | Conley | F16N 7/38 184/6.4 |
| 2016/0041025 A1 | 2/2016 | Haynes et al. | |

FOREIGN PATENT DOCUMENTS

| | | |
|---|---|---|
| CN | 105135192 A | 12/2015 |
| WO | WO 9217339 A1 | 10/1992 |
| WO | WO 2015021260 A1 | 2/2015 |
| WO | WO2015021260 A1 | 2/2015 |

OTHER PUBLICATIONS

Extended European Search Report for EP Application No. 17741850.6, dated Oct. 9, 2019, pp. 8.
First Chinese Office Action for CN Application No. 201780007187.x, dated Jun. 28, 2019, pp. 21.
International Search Report and Written Opinion for PCT Application No. PCT/US2014/013943, dated May 1, 2017, 20 pages.
Russian Office Action for RU Application No. 2018127543/28(043937), dated Mar. 17, 2020, pp. 6.
First Indonesian Office Action for ID Application No. P00201805394, dated Jul. 10, 2020, pp. 4.

\* cited by examiner

CONTINUOUS RESERVOIR LEVEL MONITORING

CROSS-REFERENCE TO RELATED APPLICATION

This application is a National Stage based off of PCT Application No. PCT/US2017/013943, entitled "CONTINUOUS RESERVOIR LEVEL MONITORING" filed Jan. 18, 2017, which claims priority to U.S. Provisional Application No. 62/279,884 entitled "CONTINUOUS RESERVOIR GREASE LEVEL MONITORING" filed on Jan. 18, 2016, the disclosures of which are incorporated by reference in their entirety.

BACKGROUND

The present disclosure relates generally to lubrication systems. More particularly, this disclosure relates to a system and method for monitoring the lubrication level in a lubricant reservoir.

Machinery often requires lubrication to function. Seals, pistons, bearings, and other parts require lubrication with small, measured amounts of grease or oil over short, frequent time intervals to prevent wear, corrosion, over-lubrication, or under-lubrication. Lubricant is injected at specific locations that require lubrication by lubricant injectors. A local lubricant reservoir stores the lubricant until the lubricant is applied. The lubricant reservoir has a limited capacity and must be refilled from a larger lubricant source when the reservoir runs low to ensure the lubricant reservoir contains sufficient lubricant for the machinery. Lubricants, and grease in particular, present unique issues for determining the remaining lubricant within the lubricant reservoir. A visual inspection of a lubricant reservoir, where the lubricant reservoir is transparent, does not provide an accurate measure of the grease level. For example, grease is relatively viscous, which can lead to air bubbles forming and being retained within the grease. Grease is also relatively tacky, such that the surface level of the grease deforms as the grease level depletes. As such, physical devices that track the surface level of the grease may not provide an accurate lubricant level reading due to the surface deforming as the grease level depletes.

SUMMARY

In one example, a lubricant level sensing system includes a reservoir assembly, a high-level sensor, and a lubricant-level estimator. The reservoir assembly includes a reservoir having a reservoir volume and configured to store a reservoir volume of lubricant, a pump assembly configured to displace lubricant from the reservoir with a plurality of pump strokes, and a displacement sensor disposed in the pump assembly. The displacement sensor senses the pump strokes and produces a count signal based on the sensed pump strokes. The high-level sensor is disposed on the reservoir and produces a reservoir-full signal based on an actual lubricant level being at a reservoir-full level. The lubricant-level estimator is configured to estimate an estimated lubricant level in the reservoir and includes a processor and a memory. The memory is encoded with instructions that, when executed by the processor, cause the processor to generate a stroke-count value based on the count signal received from the displacement sensor, to recall a reference value from the memory, and to estimate the estimated lubricant level based on a comparison of the stroke-count value and the reference value. The stroke-count value is a count of the number of pump strokes for a present estimation cycle. The reference value is a predicted number of pump strokes required to displace the reservoir volume of lubricant based on an expected volume of lubricant delivered with each pump stroke.

In another example, a method of monitoring a lubricant level of a lubricant stored in a reservoir includes monitoring a reservoir assembly for a count signal, generating a stroke-count value based on the count signal, recalling a reference value from a computer memory, calculating an estimated lubricant level based on a comparison of the stroke-count value and the reference value, and resetting the stroke-count value to a zero count based on a reservoir-full signal received from a high-level sensor. The stroke-count value is a count of a number pump strokes sensed during the estimation cycle. The reference value is a predicted number of pump strokes required to displace a reservoir volume of lubricant, and the reference value is based on an expected volume of lubricant delivered with each pump stroke In yet another example, a lubricant-level estimator includes a processor and a memory. The memory is encoded with instructions that, when executed by the processor, cause the processor to generate a stroke-count value based on a count signal received from a displacement sensor, to recall a reference value from the memory, and to estimate an estimated lubricant level based on a comparison of the stroke-count value and the reference value. The stroke-count value is a count of a number of pump strokes for a present estimation cycle. The reference value is a predicted number of pump strokes required to displace the reservoir volume of lubricant based on an expected volume of lubricant delivered with each pump stroke.

DETAILED DESCRIPTION

Figure 1:
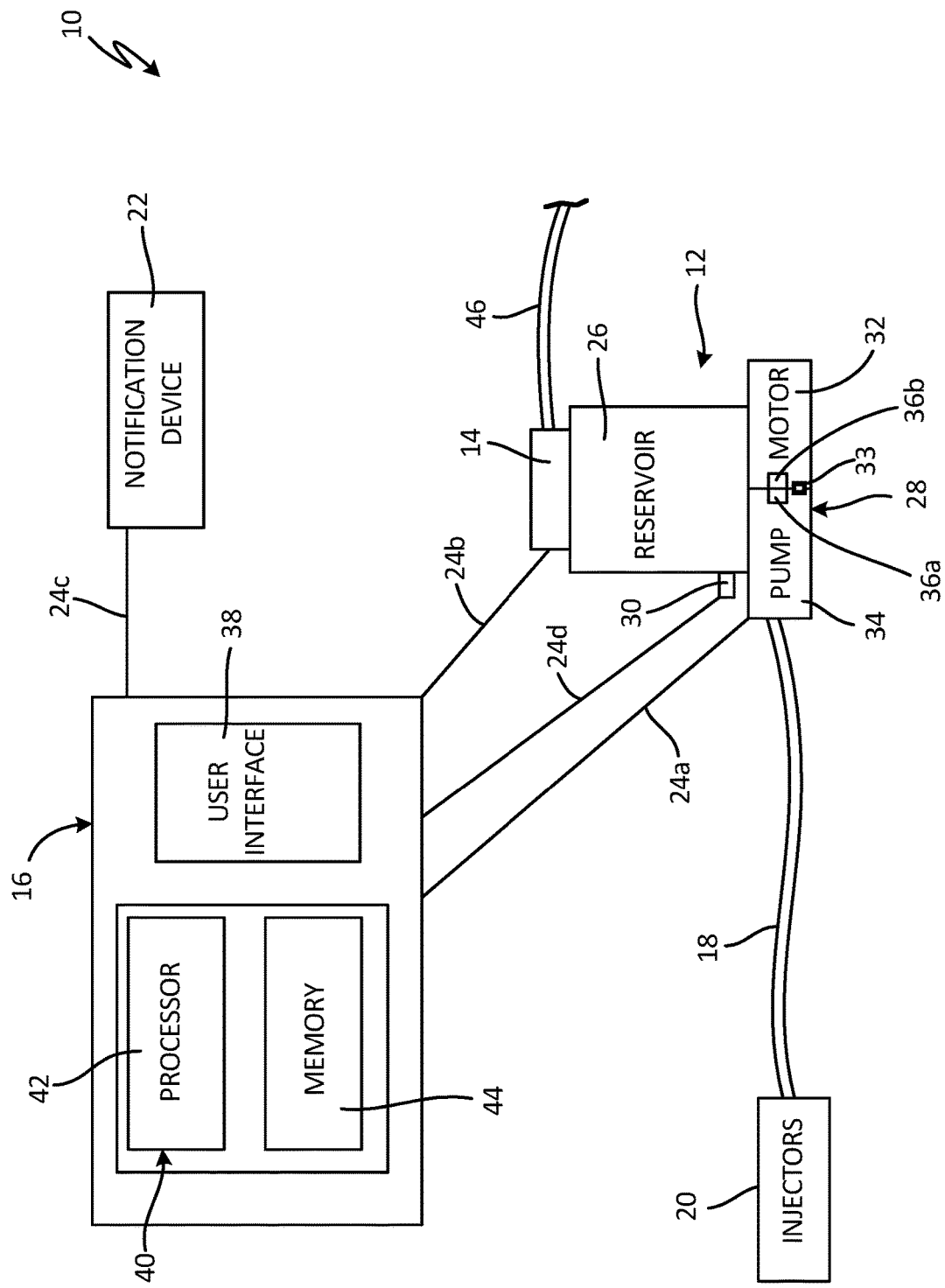
FIG. 1 is a schematic diagram of a lubricant level sensing system.

FIG. 1 is a schematic block diagram of lubrication system 10. Lubrication system 10 includes reservoir assembly 12, high-level sensor 14, control system 16, supply line 18, injectors 20, notification device 22, and communications links 24a-24d. Reservoir assembly 12 includes lubricant reservoir 26 and pump assembly 28. Lubricant reservoir 26 includes low-level sensor 30, and pump assembly 28 includes motor 32 and pump 34. Pump 34 includes displacement sensor 36a, and motor 32 includes displacement sensor 36b. Control system 16 includes user interface 38 and lubricant-level estimator 40. Lubricant-level estimator 40 includes processor 42 and memory 44.

Lubrication system 10 is a dedicated lubrication system for use with lubricated machinery that includes components such as pumps, pistons, seals, bearings, and/or shafts. Lubricant reservoir 26 is mounted to pump assembly 28. Lubricant reservoir 26 stores lubricant before the lubricant is applied to machinery. Low-level sensor 30 extends into lubricant reservoir 26 and is configured to sense when a lubricant level in lubricant reservoir 26 reaches a predetermined level. Supply line 18 extends between and connects pump assembly 28 and injectors 20. Injectors 20 supply the lubricant at desired points on the machinery. Motor 32 and pump 34 are disposed within pump assembly 28. Motor 32 is connected to and drives pump 34 via drive gears 33, and pump 34 draws lubricant from lubricant reservoir 26 and drives the lubricant downstream to injectors 20 through supply line 18. Displacement sensor 36a is disposed relative to pump 34 and is configured to sense a displacement of internal components of pump 34, thereby sensing individual pump strokes. Displacement sensor 36b is disposed relative to motor 32 and is configured to sense gear revolutions of motor 32, such as revolutions of drive gear 33, for example. High-level sensor 14 is mounted on lubricant reservoir 26 and can extend into lubricant reservoir 26.

Control system 16 communicates with high-level sensor 14, notification device 22, pump assembly 28, and low-level sensor 30, via communications links 24a-24d. Control system 16 controls pump assembly 28 between an ON state, during which pump assembly 28 displaces lubricant from lubricant reservoir 26, and an OFF state. User interface 38 enables a user to interact with control system 16. User interface 38 is a keyboard, touchscreen, or other suitable interface device.

Lubricant-level estimator 40 includes processor 42 and memory 44. Lubricant-level estimator 40 is illustrated as integrated into control system 16. Memory 44 stores software that, when executed by processor 42, estimates the lubricant level within lubricant reservoir 26, thereby providing an estimated lubricant level. It is understood, however, that lubricant-level estimator 40 can be independent of control system 16, and in such a case can communicate with control system 16 via one or more networks, such as wireless networks or wired networks or both. Lubricant-level estimator 40 provides an estimated lubricant level in lubricant reservoir 26, along with other diagnostic and performance information, such as lifetime usage estimates and variations in lubricant consumption, to notification device 22 via communications link 24c.

Processor 42, in one example, is configured to implement functionality and/or process instructions. For instance, processor 42 can be capable of processing instructions stored in memory 44. Examples of processor 42 can include any one or more of a microprocessor, a controller, a digital signal processor (DSP), an application specific integrated circuit (ASIC), a field-programmable gate array (FPGA), or other equivalent discrete or integrated logic circuitry.

Memory 44, in some examples, can be configured to store information during operation. Memory 44, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 44 is a temporary memory, meaning that a primary purpose of memory 44 is not long-term storage. Memory 44, in some examples, is described as volatile memory, meaning that memory 44 does not maintain stored contents when power to lubricant-level estimator is turned off. Examples of volatile memories can include random access memories (RAM), dynamic random access memories (DRAM), static random access memories (SRAM), and other forms of volatile memories. In some examples, memory 44 is used to store program instructions for execution by processor 42.

Memory 44, in one example, is used by software or applications running on lubricant-level estimator 40 to temporarily store information during program execution.

Memory 44, in some examples, also include one or more computer-readable storage media. Memory 44 can be configured to store larger amounts of information than volatile memory. Memory 44 can further be configured for long-term storage of information. In some examples, memory 44 includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

Notification device 22 is configured to provide an output of the information received from lubricant-level estimator 40 to the user. Examples of notification device 22 can include, a sound card, a video graphics card, a speaker, a display device (such as a liquid crystal display (LCD), a light emitting diode (LED) display, an organic light emitting diode (OLED) display, etc.) or other type of device for outputting information in a form understandable to users or machines. Notification device 22 can continuously provide the estimated lubricant level throughout the estimation cycle and can also provide various alarms, such as a low-level alarm indicating to the user that lubricant reservoir 26 should be refilled.

Pump assembly 28 is configured to displace a set volume of lubricant with each pump stroke of pump 34. The set volume that pump assembly 28 is configured to dispense is referred to as an assumed displacement volume. It is understood, however, than an actual displacement volume, which is the volume of lubricant actually displaced by pump 34 with each pump stroke, can vary from the assumed displacement volume due to differences between pump 34 and an ideal pump, wear in the system, the nature of the lubricant, the system configuration, entrained air in the lubricant, etc. As such, the assumed displacement volume is the volume of lubricant that an ideal, 100% efficient pump would displace with each pump stroke.

Displacement sensors 36a and 36b are configured to sense displacement of a component within pump assembly 28 to sense the pump strokes based on the displacement of the component and to provide a count signal to lubricant-level estimator 40 via communications link 24a. Displacement sensor 36a is configured to sense the position of the components within pump 34, thereby directly sensing each pump stroke by sensing the displacement of the components within pump 34 to generate the count signal. Displacement sensor 36b is configured to sense the gear revolutions of motor 32, thereby indirectly sensing each pump stroke by the rotational displacement of the gears of motor 32 to generate the count signal. Because a gear ratio between motor 32 and pump 34 is known, gear revolutions is directly related to pump strokes. While displacement sensors 36a and 36b are described as sensing pump strokes, either directly or indirectly, and generating the count signal of pump strokes, it is understood that displacement sensors 36a and 36b can be configured to sense and generate the count signal in response to individual pump strokes, to pump cycles, or to any other suitable measure of the displacement of pump 34.

High-level sensor 14 senses when the lubricant level reaches a maximum reservoir capacity when lubricant reservoir 26 is being filled, and produces a reservoir-full signal in response to the lubricant level reaching the maximum reservoir capacity. High-level sensor 14 communicates with control system 16 via communications link 24b, which can be a wired or wireless connection. High-level sensor 14 is preferably an autofill shutoff valve, such as that described in Application No. PCT/US16/26823, the disclosure of which is hereby incorporated by reference in its entirety. Where high-level sensor 14 is an autofill shutoff valve, high-level sensor 14 generates the reservoir-full signal in response to the autofill shutoff valve shifting to a closed position. High-level sensor 14 being an autofill shutoff valve also ensures that lubricant reservoir 26 is not underfilled or overfilled during the refill process.

Low-level sensor 30 is configured to sense when the lubricant level in lubricant reservoir 26 reaches a predetermined level and to produce a low-level signal in response to the lubricant level reaching the predetermined level. Low-level sensor 30 provides the low-level signal to lubricant-level estimator 40 via communications link 24d. The predetermined level can be any desired lubricant level within lubricant reservoir, but low-level sensor 30 is preferably positioned to sense when the actual lubricant level reaches a 0% full level. It is understood, however, that low-level sensor 30 can be positioned at any desired location on lubricant reservoir 26 to generate and provide the low-level signal to lubricant-level estimator 40.

Lubricant-level estimator 40 utilizes a stroke-count value, which is a count of the number of pump strokes completed for the present estimation cycle, and a reference value, which is a predicted number of pump strokes required to displace the full reservoir volume of lubricant assuming that the pump displaces a set volume of lubricant per pump stroke, to calculate the estimated lubricant level. The stroke-count value is dynamic in that the stroke-count value is continuously updated throughout the estimation cycle by lubricant-level estimator 40 in response to the count signals from displacement sensors 36a and 36b. The reference value is fixed in that the reference value represents a predicted number of pump strokes required to displace the full reservoir volume.

The stroke-count value is tracked, recorded, and updated by lubricant-level estimator 40 throughout the estimation cycle. The stroke-count value is cumulative for the entire estimation cycle, such that at any given time during the estimation cycle the stroke-count value is a count of the number of pump strokes to that point in the estimation cycle. The reference value represents an upper limit of the stroke-count value. With the reference value representing the upper limit of the stroke-count value, the estimated lubricant level can be calculated based on a difference between the reference value and the stroke-count value.

Memory 44 stores the stroke-count value and the reference value and is encoded with instructions that, when executed by processor 42, cause the processor 42 to execute a software program estimating the lubricant level within lubricant reservoir 26. Lubricant-level estimator 40 can provide the estimated lubricant level in any desired form, such as a percent of lubricant remaining in lubricant reservoir 26, a percent of lubricant dispersed from lubricant reservoir 26, a number of pump strokes remaining until lubricant reservoir 26 is empty, a number of lubrication cycles remaining until lubricant reservoir 26 is empty, a volume of lubricant remaining in lubricant reservoir 26, and a volume of lubricant delivered from lubricant reservoir 26, among others.

During operation, lubricant-level estimator 40 continuously estimates the estimated lubricant level. Lubricant-level estimator 40 tracks and estimates the lubricant level within lubricant reservoir 26 across at least one estimation cycle. An estimation cycle begins when the actual lubricant level in lubricant reservoir 26 is at the reservoir-full level, and the estimation cycle ends when the estimated lubricant level is of an empty reservoir. At the beginning of an estimation cycle pump assembly 28 has not yet displaced any lubricant from lubricant reservoir 26, so the stroke-count value is zero. Because the stroke-count value is zero at the beginning of the estimation cycle, the estimated lubricant level produced by lubricant-level estimator 40 is also at the reservoir-full level at the beginning of each estimation cycle. As such, the estimated lubricant level matches the actual lubricant level at the beginning of each estimation cycle. Each estimation cycle includes at least one lubrication cycle. A lubrication cycle begins when pump assembly 28 is activated and ends when pump assembly 28 is deactivated. The lubricant level within lubricant reservoir 26 drops with each lubrication cycle of pump assembly 28.

A lubrication cycle begins with control system 16 activating pump assembly 28. Motor 32 powers pump 34, which draws lubricant from lubricant reservoir 26 and drives the lubricant downstream through supply line 18. Pump 34 continues to drive the lubricant into supply line 18 to build a pressure in supply line 18 until the pressure causes injectors 20 to dispense set amounts of lubricant to the machinery. After injectors 20 dispense the lubricant, the pressure in supply line 18 is relieved. Pump assembly 28 is either deactivated by control system 16 or is configured to deactivate after a given time period or when a given pressure is reached in supply line 18. With pump assembly 28 deactivated, the lubrication cycle ends, and lubrication system 10 is ready for the next lubrication cycle.

Each pump stroke is sensed by displacement sensors 36a or 36b. In response to the sensed pump stroke, displacement sensors 36a and 36b generate the count signal and provide the count signal to lubricant-level estimator 40 through communications link 24a. The stroke-count value is a count of the number of pump strokes completed for the present estimation cycle. The count signal can be generated by directly sensing the number of pump strokes, with displacement sensor 36a, and by sensing a motor-performance characteristic such as the number of gear revolutions, with displacement sensor 36b. It is understood that the motor-performance characteristic can also be one of current or voltage.

Lubrication system 10 proceeds through multiple lubricant cycles to complete a single estimation cycle. Lubricant-level estimator 40 provides the estimated lubricant level throughout the estimation cycle, which allows the user to determine when lubricant reservoir 26 is to be refilled, based on the estimated lubricant level. When lubricant reservoir 26 is refilled, high-level sensor 14 generates the reservoir-full signal in response to the actual lubricant level reaching the reservoir-full level, and high-level sensor 14 communicates the reservoir-full signal to lubricant-level estimator 40. The reservoir-full signal informs lubricant-level estimator 40 that the reservoir is full and that a new estimation cycle is beginning. As such, lubricant-level estimator 40 resets the estimated lubricant level to the reservoir-full level, such that the estimated lubricant level and the actual lubricant level are both at the reservoir-full level at the beginning of an estimation cycle.

Lubricant-level estimator 40 can also generate and store various values based on the count signals, in addition to the stroke-count value. For example, a first lubrication cycle count can be generated and stored for a first lubrication cycle and a second lubrication cycle count can be generated and stored for the second lubrication cycle, where each lubrication cycle count is a count of the pump strokes required to complete that lubrication cycle only. Processor 42 can then execute the software stored in memory 44 to provide diagnostic information regarding lubrication system 10 through a comparison of the first lubrication cycle count and the second lubrication cycle count. For example, where the second lubrication cycle count differs from the first lubrication cycle count, such a difference can indicate a failure of a component of pump assembly 28, and lubricant-level estimator 40 can generate and provide an alarm signal to notification device 22. Notification device 22 can provide an alert the user based on the alarm signal, thereby notifying the user of the discrepancy.

By way of example, an initial estimation cycle and a subsequent estimation cycle, following the initial estimation cycle, are discussed below.

The initial estimation cycle begins with the actual lubricant level in lubricant reservoir 26 at the reservoir-full level. The reference value stored in memory 44 and utilized by lubricant-level estimator 40 for the initial estimation cycle is a theoretical reference value, which is the predicted number of pump strokes required to displace the full reservoir volume of lubricant assuming that pump 34 is an ideal pump having a 100% efficiency such that pump 34 delivers the assumed volume of lubricant per pump stroke. The theoretical reference value is pre-stored in memory 44 before any estimation cycle has been run. The theoretical reference value is dependent upon the volume of lubricant reservoir 26 and the ideal displacement of pump 34, and as such the theoretical reference value will vary depending on the specific lubricant reservoir and pump utilized in lubrication system 10.

The stroke-count value is initially at a baseline value, preferably a zero count, as pump assembly 28 has not displaced any lubricant from lubricant reservoir 26. A first lubrication cycle is initiated by control system 16 activating pump assembly 28. With pump assembly 28 activated, displacement sensors 36a and 36b sense the rotation of motor 32 and/or the position of the displacement components within pump 34. Displacement sensor 36a and/or 36b generates the count signal and communicates the count signal to lubricant-level estimator 40. Lubricant-level estimator 40 generates the stroke-count value based on the count signal. As discussed above, the stroke-count value is a count of the number of pump strokes completed for the present estimation cycle. As such, the stroke-count value increases throughout the initial estimation cycle as the count signal is received. The stroke-count value at the end of the first lubrication cycle can be stored in memory 44 as a first lubrication cycle count.

After the first lubrication cycle is complete, pump assembly 28 is in an OFF state until the machinery requires additional lubrication. Each lubrication cycle begins when control system 16 activates pump assembly 28, and the lubrication cycles are typically based on a time interval between each lubrication cycle.

When the machinery requires additional lubrication a second lubrication cycle begins. Lubricant-level estimator 40 receives the count signals from displacement sensors 36a and 36b and tracks and updates the stroke-count value in response to the count signals. The initial estimation cycle continues until lubricant-level estimator 40 provides an estimated lubricant level at the reservoir-empty level or until the reservoir-full signal is received from high-level sensor 14, thereby causing lubricant-level estimator 40 to reset the estimated lubricant level to the reservoir-full level.

The estimated lubricant level is calculated across for the initial estimation cycle based on the stroke-count value and the theoretical reference value. Because the theoretical reference value represents the predicted upper limit of the stroke-count value, the estimated lubricant level is calculated based on the stroke-count value and the theoretical reference value. For example, the percent of lubricant remaining in lubricant reservoir 26 can be calculated by subtracting the stroke-count value from the theoretical reference value, and the difference can be divided by the theoretical reference value to generate the percent of lubricant remaining in lubricant reservoir 26. In another example, the volume of lubricant remaining in lubricant reservoir 26 can be calculated by subtracting the stroke-count value from the theoretical reference value and multiplying the difference by the assumed displacement volume per pump stroke for the ideal pump, which assumed displacement volume was used to generate the theoretical reference value. In another example, the volume of lubricant dispersed from lubricant reservoir can be calculated by multiplying the stroke-count value by the assumed displacement volume per pump stroke for the ideal pump, which was used to generate the theoretical reference value. It is understood, however, that lubricant-level estimator 40 can estimate the estimated lubricant level in any desired form, such as a percent of lubricant remaining in lubricant reservoir 26, a percent of lubricant dispersed from lubricant reservoir 26, a number of pump strokes remaining until lubricant reservoir 26 is empty, a number of lubrication cycles remaining until lubricant reservoir 26 is empty, a volume of lubricant remaining in lubricant reservoir 26, and a volume of lubricant dispersed from lubricant reservoir 26, among others.

Lubricant-level estimator 40 continuously updates the stroke-count value and the comparison between the stroke-count value and the theoretical reference value as the count signals are received from displacement sensors 36a and/or 36b. As such, the estimated lubricant level is continuously updated throughout the initial estimation cycle.

Lubricant-level estimator 40 communicates the estimated lubricant level to notification device 22 via communications link 24c. Notification device 22 can provide the estimated lubricant level to the user in any desired manner, including audibly or visually. Lubricant-level estimator 40 can also communicate various diagnostic information or other advanced metrics based on the estimated lubricant level and previous estimates. The estimated lubricant level can be in any desired form, such as a percent of lubricant remaining in lubricant reservoir 26, a percent of lubricant dispersed from lubricant reservoir 26, a number of pump strokes remaining until lubricant reservoir 26 is empty, a number of lubrication cycles remaining until lubricant reservoir 26 is empty, a volume of lubricant remaining in lubricant reservoir 26, and a volume of lubricant dispersed from lubricant reservoir 26, among others.

The estimated lubricant level approaching the reservoir-empty level informs the user that lubricant reservoir 26 needs to be refilled. To refill lubricant reservoir 26, a source of refill lubricant is connected to lubricant reservoir 26 via refill line 46. The lubricant flows into lubricant reservoir 26 through refill 46 until the lubricant level trips high-level sensor 14. High-level sensor 14 generates the reservoir-full signal when high-level sensor 14 senses that the lubricant level has reached the maximum reservoir capacity. The reservoir-full signal is provided to lubricant-level estimator 40 by communications link 24b. The reservoir-full signal indicates to lubricant-level estimator 40 that the lubricant level is at the reservoir-full level. And in response to the reservoir-full signal, lubricant-level estimator 40 resets the stroke-count value to zero, thereby resetting the estimated lubricant level to the reservoir-full level. Lubricant-level estimator 40 is thus ready to estimate the lubricant level through another estimation cycle.

High-level sensor 14 is preferably an autofill shutoff valve, but high-level sensor 14 can be any suitable device for sensing when the lubricant level reaches the maximum reservoir capacity. Where high-level sensor 14 is an autofill shutoff valve, the reservoir-full signal is generated when the autofill shutoff valve shifts to the closed position.

Before the subsequent estimation cycle begins, lubricant-level estimator 40 adjusts the reference value based on the initial estimation cycle to improve the accuracy of the estimated lubricant level across the subsequent lubrication cycle. Memory 44 is further configured to store software that, when executed by processor 42, adjusts the theoretical reference value to an adjusted reference value that more closely matches the actual components of lubrication system 10.

During each estimation cycle, low-level sensor 30 senses when the lubricant level has reached a predetermined low level, generates a low-level signal in response to the lubricant level reaching the predetermined level, and provides the low-level signal to lubricant-level estimator 40 via communications link 24d. Lubricant-level estimator 40 stores the stroke-count value at the time the low-level signal is received from low-level sensor 30 as a "true count." The true count is the number of pump strokes required to actually disperse the volume of lubricant required to drop the actual lubricant level from the reservoir-full level sensed by high-level sensor 14 to the predetermined level sensed by low-level sensor 30, as determined from a previous estimation cycle. The actual displacement volume per pump stroke is calculated from the true count by dividing the total volume of lubricant required to drop the actual lubricant level in lubricant reservoir 26 from the reservoir-full level to the predetermined level by the true count. The actual displacement volume per pump stroke thus accounts for any efficiency loss between pump 34 and an ideal pump. Efficiency loss can occur due to a variety of reasons. For example, air bubbles can become entrained in the lubricant, and the entrained air bubbles are compressible and thus can cause a pump stroke to deliver less lubricant than would occur if there were no air bubbles present in the lubricant. Pump efficiency is also affected by the temperature of the lubricant and the area where lubricant reservoir 26 is stored as well as the viscosity of the lubricant. As such, pump efficiency is affected by the environment that lubricant reservoir 26 and pump assembly 30 are stored in, by impurities such as air bubbles disposed within the lubricant, by the nature of the lubricant itself, and by other external or internal factors.

The theoretical reference value is adjusted with the true count to produce the adjusted reference value. As discussed above, the theoretical reference value represents the predicted upper limit of the stroke-count value for a single estimation cycle based on pump 34 being an ideal pump that displaces the assumed displacement volume per pump stroke. The adjusted reference value is calculated by replacing the assumed displacement volume per pump stroke with the actual displacement volume per pump stroke, as calculated from the true count, and dividing the maximum reservoir capacity by the actual displacement volume. Dividing the maximum reservoir capacity by the actual displacement volume per pump stroke gives the number of pump strokes that were required to empty lubricant reservoir 26 across a previous estimation cycle. As such, the adjusted reference value is based on previous iterations of the estimation cycles.

The predetermined low level is preferably the reservoir-empty level such that the low-level signal is generated when lubricant reservoir 26 is empty. The true count is then a count of the number of pump strokes required to fully empty lubricant reservoir 26. In such an instance, the theoretical reference value can be adjusted to the adjusted reference value by utilizing the true count as the adjusted reference value.

The adjusted reference value is stored in memory 44 and is utilized to calculate the estimated lubricant level for the subsequent estimation cycle. Because the adjusted reference value is based on the actual displacement volume per pump stroke from a previous estimation cycle, the estimated lubricant level calculated utilizing the adjusted reference value more closely tracks the actual lubricant level than the estimated lubricant level calculated utilized the theoretical reference value. Lubricant-level estimator 40 thus provides a more accurate estimated lubricant level by calculating and utilizing the adjusted reference value.

Lubrication system 10 then proceeds to the subsequent estimation cycle. Lubricant-level estimator 40 calculates the estimated lubricant level across the subsequent estimation cycle based on the stroke-count value and the adjusted reference value. The adjusted reference value represents the predicted upper limit of the stroke-count value, based on the displacement-rate for a previous estimation cycle. The estimated lubricant level is thus calculated based on the stroke-count value and the reference value. For example, the percent of lubricant remaining in lubricant reservoir 26 can be calculated by subtracting the stroke-count value from the adjusted reference value, and the difference can be divided by the adjusted reference value to generate the percent of lubricant remaining in lubricant reservoir 26. In another example, the volume of lubricant remaining in lubricant reservoir 26 can be calculated by subtracting the stroke-count value from the adjusted reference value and multiplying the difference by the actual displacement volume per pump stroke calculated from the true count. In another example, the volume of lubricant dispersed from lubricant reservoir can be calculated by multiplying the stroke-count value by the per pump stroke calculated from the true count.

Lubricant-level estimator 40 continuously updates the stroke-count value and the comparison between the stroke-count value and the adjusted reference value as the count signals are received from displacement sensors 36a and/or 36b. As such, the estimated lubricant level is continuously updated throughout the initial estimation cycle. Because the adjusted reference value is based on the actual displacement volume per pump stroke as determined from a previous estimation cycle, the estimated lubricant level for the subsequent estimation cycle more accurately tracks the actual lubricant level in lubricant reservoir 26.

Lubricant-level estimator 40 can adjust the reference value after each estimation cycle based on any desired previous estimation cycle. For example, the adjustment can be based on the immediately-previous estimation cycle, an average of the true counts across multiple estimation cycles, or a lifetime average of true counts.

In addition to calculating, tracking, and providing the estimated lubricant level lubricant-level estimator 40 is able to calculate, track, and provide other metrics regarding lubrication system 10. For example, lubricant-level estimator 40 can record a final count at the end of each estimation cycle. An estimate of the lubricant consumed during the estimation cycle can be calculated based on the final count. The estimate of the lubricant consumed for each estimation cycle can be stored in memory 44 and can be provided, individually or in aggregate, to the user via notification device 22. Lubricant-level estimator 40 is thus able to measure and record lubricant usage over time and is able to report various parameters regarding lubricant consumption.

Lubricant-level estimator 40 can also provide the actual displacement volume per pump stroke where lubrication system 10 includes low-level sensor 30. As discussion above, the actual displacement volume per pump stroke is calculated by dividing the total volume of lubricant required to drop the actual lubricant level in lubricant reservoir 26 from the reservoir-full level sensed by high-level sensor 14 to the predetermined low level sensed by low-level sensor 32 by the true count. The actual displacement volume per pump stroke can provide important diagnostic information regarding pump assembly 28, such as the displacement efficiency of pump 34, and variations in the actual displacement volume per pump stroke across different estimation cycles can indicate that maintenance is required. By tracking the various advanced-usage metrics, lubricant-level estimator 40 can provide diagnostic information to the user.

Lubricant-level estimator 40 provides significant advantages. Lubricant-level estimator 40 continuously provides the user with the estimated lubricant level within lubricant reservoir 26. The estimated lubricant level allows the user to properly schedule refills to minimize downtime and to track lubricant usage. Lubricant-level estimator 40 is able to track and provide to the user the estimated lubricant level with minimal moving parts. For example, lubricant-level estimator 40 calculates and tracks the estimated lubricant level without requiring a follower plate or other mechanical device to track the lubricant level. Moreover, by providing the estimated lubricant level to the user, the lubricant reservoir 26 is prevented from being refilled more often than necessary. Limiting the number of refills decreases downtime and decreases the possibility of contaminants entering the lubrication system 10 during a refill. Lubricant-level estimator 40 is also self-adjusting in response to the low-level signal, thereby providing improved estimate accuracy with each iteration of the estimation cycles. Furthermore, lubricant-level estimator 40 can measure and record various advanced metrics, such as lubricant usage over time, and is able to report various parameters regarding lubricant consumption. The estimated lubricant level provides the lubricant remaining in the reservoir as well as the rate of usage, such that maintenance can be scheduled ahead of time to prevent the reservoir running dry. As such, lubricant-level estimator 40 continuously estimating the lubricant level and providing the estimated lubricant level to the user allows the user to effectively plan maintenance related to the lubricant system.

Figure 2A:
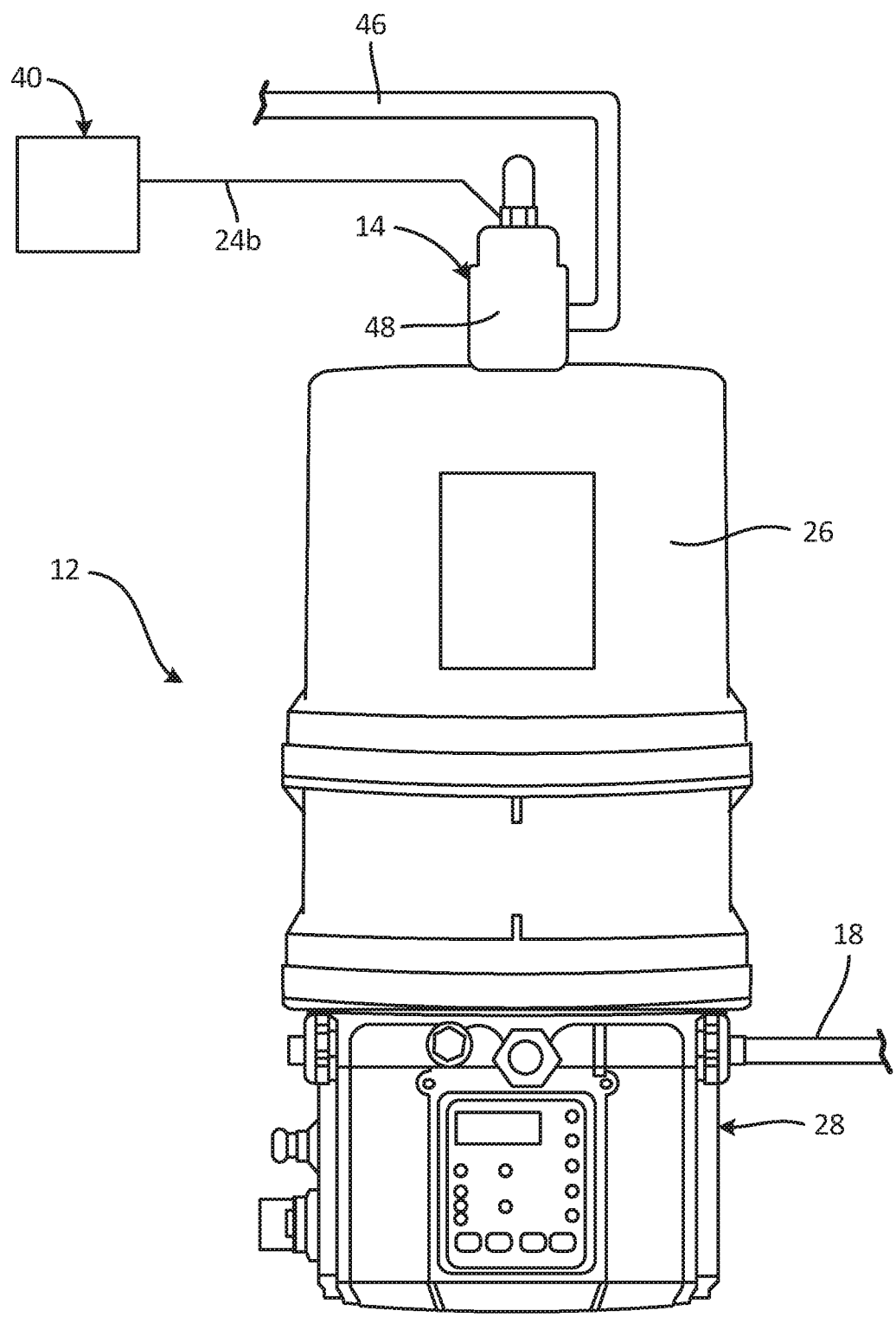
FIG. 2A is a front elevation view of a reservoir assembly.
Figure 2B:
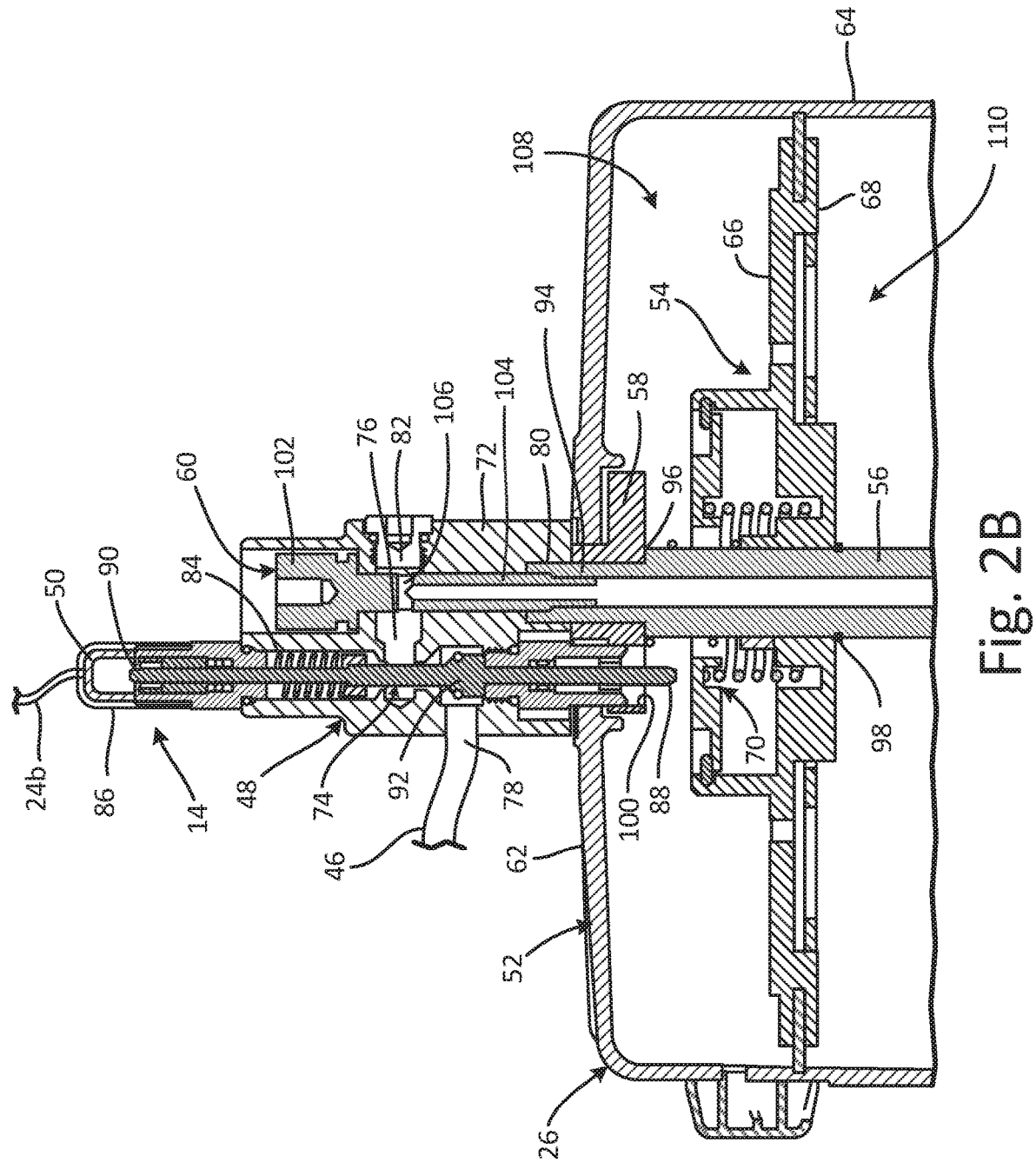
FIG. 2B is a cross-sectional view of an example autofill shutoff valve.

FIG. 2A is a front elevation view of reservoir assembly 12 and high-level sensor 14. FIG. 2B is a cross-sectional view of high-level sensor 14. FIGS. 2A and 2B will be discussed together. Reservoir assembly 12 includes lubricant reservoir 26 and pump assembly 28. High-level sensor 14 includes autofill shutoff valve 48 and signal switch 50. Lubricant reservoir 26 includes housing 52, actuator 54, fill tube 56, alignment plate 58, and connecting bolt 60. Housing 52 includes top surface 62 and side wall 64. Actuator 54 includes top surface 66, bottom surface 68, and overtravel mechanism 70. Autofill shutoff valve 48 includes valve body 72, valve stem 74, lubricant flow path 76, lubricant inlet 78, first lubricant outlet 80, second lubricant outlet 82, return spring 84, and signal bulb 86. Valve stem 74 includes first end 88, second end 90, and sealing portion 92. Fill tube 56 includes first end 94, shoulder 96, and plate retaining clip 98.

Alignment plate 58 includes aperture 100. Connecting bolt 60 includes head 102 and shank 104, and shank 104 includes lubricant ports 106.

Lubricant reservoir 26 is mated to pump assembly 28, and lubricant reservoir 26 is configured to store lubricant before the lubricant is applied to machinery. It is understood that lubricant reservoir 26 and pump assembly 28 can be mated in any suitable manner, such as pump assembly 28 being mounted above or below lubricant reservoir 26, pump assembly 28 being disposed in lubricant reservoir 26, pump assembly 28 being integrally formed with lubricant reservoir 26, or any other desired configuration. Supply hose 18 is connected to pump assembly 28 and receives lubricant from pump assembly 28. Communications link 24b extends between high-level sensor 14 and lubricant-level estimator 40. Communications link 24b allows high-level sensor 14 and lubricant-level estimator 40 to communicate, and communications link 24b can be either wired or wireless.

Actuator 54 is disposed within housing 52 and divides housing 52 into upper portion 108 and lower portion 110. Overtravel mechanism 70 is disposed on actuator 54 and is configured to encounter first end 88 of valve stem 74. Autofill shutoff valve 48 is disposed on top surface 62 of housing 52. Lubricant flow path 76 extends through valve body 72. Lubricant inlet 78 extends into valve body 72 and is configured to receive refill line 46 and to provide lubricant from refill line 46 to lubricant flow path 76. Fill tube 56 extends through actuator 54, and first end 94 of fill tube 56 extends through alignment plate 58 and engages shank 104 of connecting bolt 60. Plate retaining clip 98 is disposed on fill tube 56 and limits the downward movement of actuator 54. Connecting bolt 60 extends through autofill shutoff valve 48, and head 102 is disposed outside of valve body 72 while shank 104 extends through valve body 72 to engage fill tube 56 and secure autofill shutoff valve 48 to housing 52. Shoulder 96 abuts a bottom of alignment plate 58 and retains alignment plate 58 in position. Lubricant ports 106 are disposed in lubricant flow path 76 and configured to receive lubricant from lubricant flow path 76. First lubricant outlet 80 extends into valve body 72 proximate the connection of shank 104 and connecting bolt 60, and first lubricant outlet 80 provides lubricant directly to lubricant reservoir 26 through a top portion of housing 52. Second lubricant outlet 82 extends into valve body 72 and may receive external plumbing to allow lubricant to flow to lubricant reservoir through autofill shutoff valve 48 and the external plumbing.

Valve stem 74 is disposed within valve body 72 and extends through autofill shutoff valve 48. First end 88 extends through aperture 100 of alignment plate 58 and into upper portion 108 of housing 52. Sealing portion 92 extends from valve stem 74 and is disposed within lubricant flow path 76 proximate lubricant inlet 78. Second end 90 extends from sealing portion 92 and proximate signal switch 50. Return spring 84 is disposed about second end 90 and biases valve stem 74 into the open position shown in FIG. 2B.

Lubricant reservoir 26 stores a set volume of lubricant that can be disbursed to downstream machinery during a lubrication cycle. Pump assembly 28 draws the lubricant from lubricant reservoir 26 and drives the lubricant downstream. When lubricant reservoir 26 is ready to be refilled, the refill lubricant is provided to lubricant reservoir 26 through refill line 46. The refill lubricant flows to autofill shutoff valve 48, enters lubricant inlet 78, flows through lubricant flow path 76, and is provided to lower portion 110 of housing 52 through fill tube 56. The lubricant continues to flow to lubricant reservoir 26 until the rising lubricant level encounters bottom surface 68 of actuator 54. The rising lubricant encounters bottom surface 68 and pushes actuator 54 upwards. Actuator 54 continues to rise until overtravel mechanism 70 encounters first end 88 of valve stem 74. Overtravel mechanism 70 prevents actuator 54 from damaging valve stem 74 if actuator 54 continues to rise after valve stem 74 shifts to the closed position.

When actuator 54 encounters first end 88, actuator 54 continues to rise and causes valve stem 74 to shift from the open position to a closed position where sealing portion 92 blocks the flow of lubricant through the lubricant flow path 76. In the closed positon, sealing portion 92 prevents additional refill lubricant from flowing through autofill shutoff valve 48 and to lubricant reservoir 26. With the connection between lubricant inlet 78 and lubricant flow path 76 sealed by sealing portion 92, a pressure in refill line begins to build, and the rising pressure indicates that autofill shutoff valve 48 is closed and that the refill process is complete.

The reservoir-full signal is generated in response to the valve stem 74 shifting from the open position to the closed position. With valve stem 74 in the closed position, second end 90 of valve stem 74 extends into signal bulb 86 and encounters signal switch 50, which can be a proximity sensor, a pressure sensor, a displacement sensor, a limit switch, or any other suitable device for sensing when valve stem 74 has shifted from the open position to the closed position. Second end 90 encountering signal switch 50 causes signal switch 50 to generate the reservoir-full signal and communicate the reservoir-full signal to lubricant-level estimator 40 along communication link 24b. For example, where signal switch 50 is a limit switch, signal switch 50 is activated by valve stem 74 shifting to the closed position and signal switch 50 generates the reservoir-full signal in response to valve stem 74 shifting to the closed position. In another example signal switch 50 is a proximity sensor and second end 90 is dimensioned to trigger the proximity sensor when valve stein 74 is in the closed position but not when valve stem 74 is in the open position.

Autofill shutoff valve 48 generates the reservoir-full signal only when the lubricant level is at the maximum reservoir capacity, thereby ensuring that the reservoir-full signal is generated only when the lubricant level is truly at the full level. As such, the estimated lubricant level is ensured of matching the actual lubricant level at the beginning of the next estimation cycle, as both the estimated and actual lubricant levels will be at the maximum reservoir capacity. In this way, autofill shutoff valve 48 recalibrates lubricant-level estimator 40 each time the reservoir-full signal is generated. Because the autofill shutoff valve 48 only generates the reservoir-full signal when the lubricant level is the maximum reservoir capacity, autofill shutoff valve 48 ensures that there is no error between the estimated lubricant level and the actual lubricant level at the beginning of the next estimation cycle.

Autofill shutoff valve 48 generating the reservoir-full signal provides significant advantages. Autofill shutoff valve 48 prevents a user from under- or overfilling lubricant reservoir 26. Moreover, autofill shutoff valve 48 closes only when the lubricant level is at the maximum reservoir capacity, thereby ensuring that the estimated lubricant level will thus match the actual lubricant level at the beginning of the next estimation cycle. Autofill shutoff valve 48 thus recalibrates lubricant-level estimator for a subsequent estimation cycle by eliminating any error between the estimated lubricant level and the actual lubricant level.

Figure 3A:
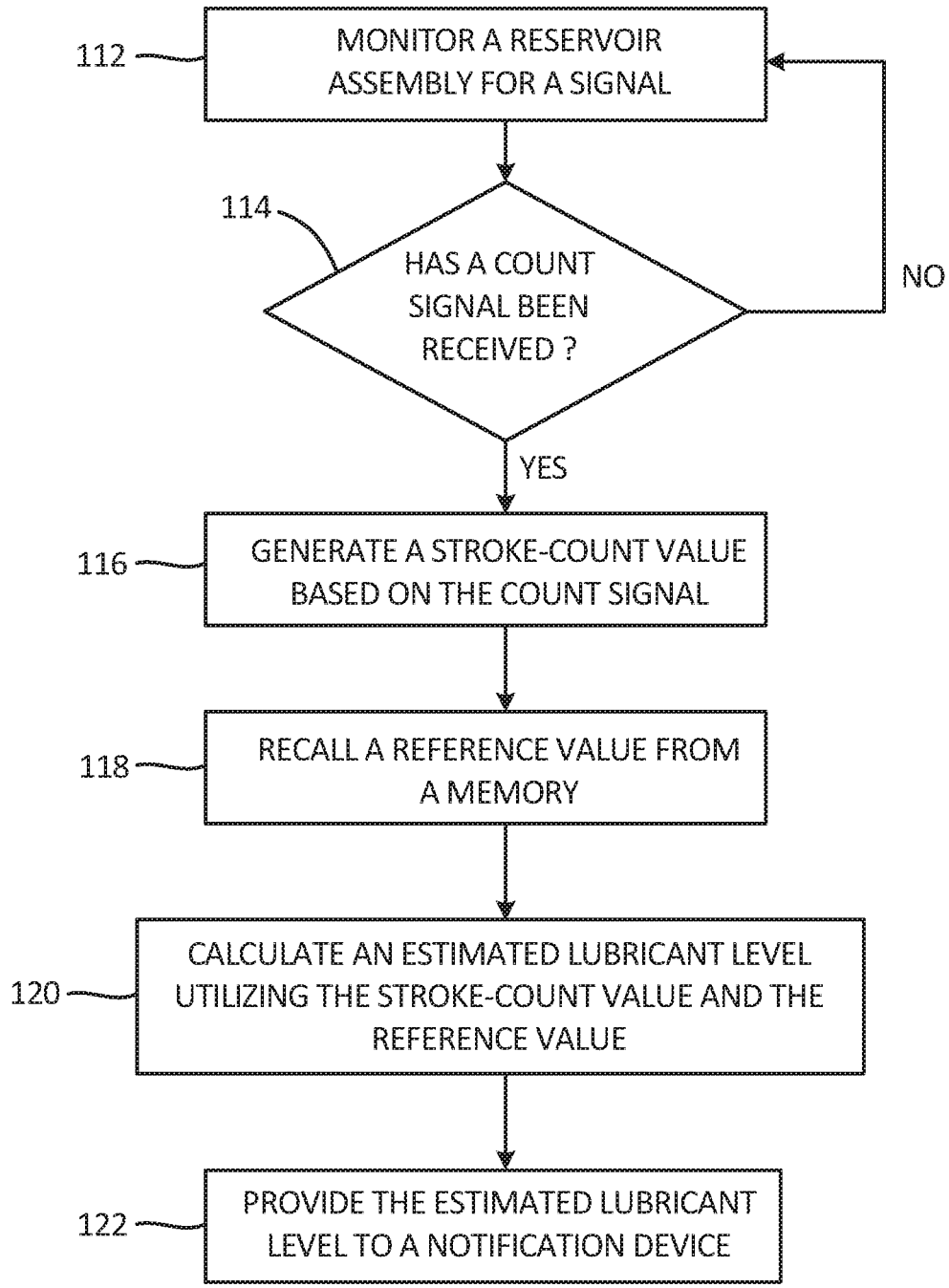
FIG. 3A is a flow diagram of an estimation routine for estimating a lubricant level a lubricant reservoir.
Figure 3B:
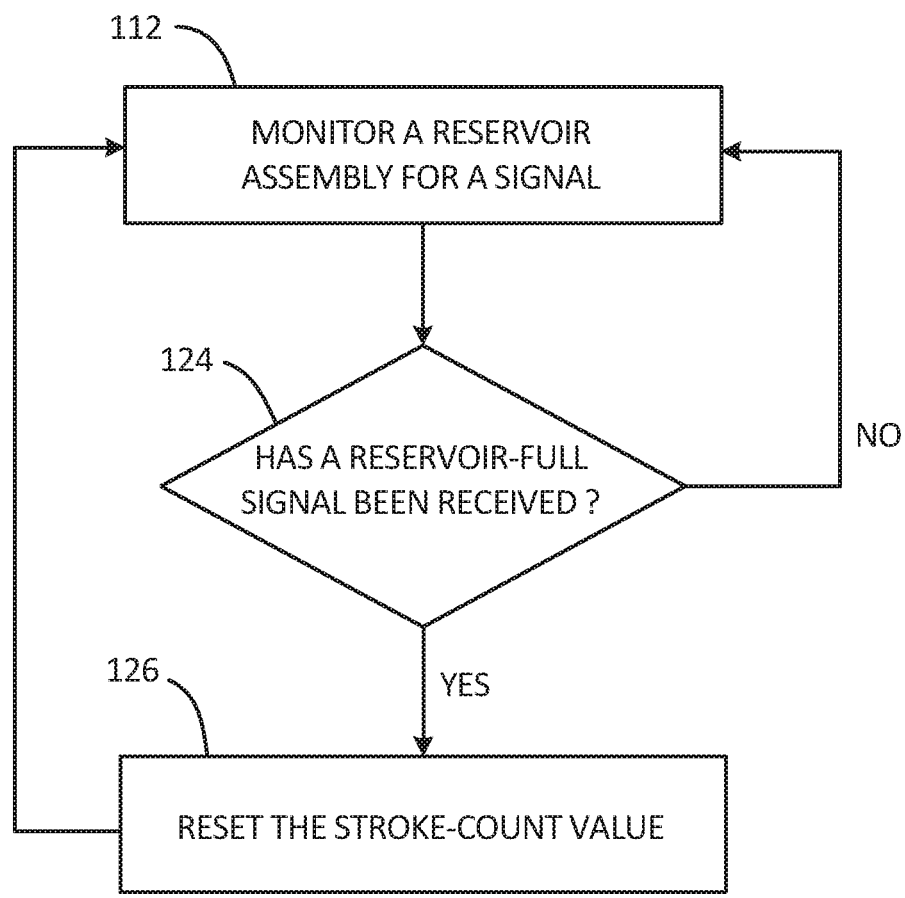
FIG. 3B is a flow diagram of a count reset routine.
Figure 3C:
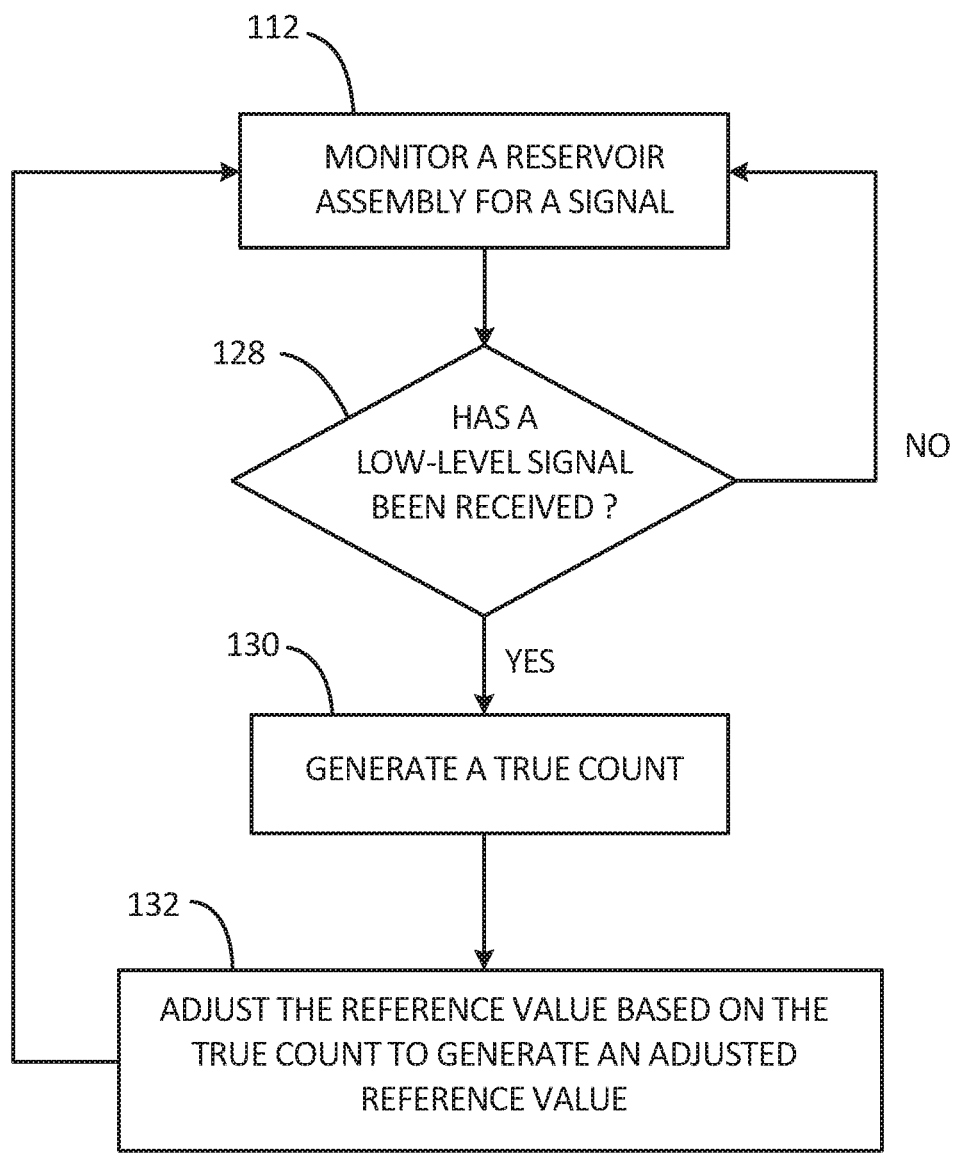
FIG. 3C is a flow diagram of an adjustment routine.

FIG. 3A is a flow diagram illustrating an estimation routine for estimating a lubricant level in a lubricant reservoir. FIG. 3B is a flow diagram illustrating a count reset routine. FIG. 3C is a flow diagram illustrating an adjustment routine. FIGS. 3A-3C will be discussed together. Each of the estimation routine, the count reset routine, and the adjustment routine begin at step 112. In step 112, lubricant-level estimator 40 (best seen in FIG. 1) monitors a reservoir assembly for a signal. For the estimation routine of FIG. 3A, lubricant-level estimator 40 monitors the reservoir assembly for a count signal. For the count reset routine of FIG. 3B, lubricant-level estimator 40 monitors the reservoir assembly for a reservoir-full signal. For the adjustment routine of FIG. 3C, lubricant-level estimator 40 monitors the reservoir assembly for a low-level signal.

In step 112 of FIG. 3A, the lubricant-level estimator 40 is monitoring the reservoir assembly for a signal. If the signal received is a count signal, then lubricant-level monitor 40 proceeds through the estimation routine. The count signal is generated by a displacement sensor (such as displacement sensors 36a and 36b (shown in FIG. 1)) in response to a pump stroke. The displacement sensors sense one of a number of pump strokes and a number of gear revolutions, which directly correlates to the number of pump strokes. In step 114, lubricant-level estimator 40 asks if the count signal has been received. If the answer to step 114 is NO, then lubricant level-estimator 40 continues to monitor the reservoir assembly for a count signal. If the answer to step 114 is YES, then lubricant-level estimator 40 moves to step 116.

In step 116, a stroke-count value is generated. The stroke-count value is a sum of the pump strokes to that point in the present estimation cycle. The count signal provides one of the number of pump strokes and the number of gear revolutions to the lubricant-level estimator. Where the count signal is of the number of gear revolutions, lubricant-level estimator can determine the number of pump strokes based on the known gear ratio between the motor and the pump.

In step 118, a reference value is recalled from a storage device, such as memory 44 (shown in FIG. 1). The reference value is based on a volume of the lubricant reservoir, such as lubricant reservoir 26 (shown in FIGS. 1 and 2A), and the reference value is a prediction of the number of pump strokes required to displace the full volume of lubricant reservoir 26. For an initial estimation cycle, the reference value is a theoretical reference value, which is a predication of the number of pump strokes required to displace the full volume of lubricant reservoir 26 based on the assumption that the pump is an ideal pump that is 100% efficient such that the pump displaces the assumed displacement volume with each pump stroke. The reference value can represent a predicted upper limit of the stroke-count value. For example, where the lubricant reservoir has a capacity of 5 L, an ideal pump stroke displaces 1 ml/stroke, and there are 5 gear revolutions/stroke, the reference value could be 5,000 pump strokes or 25,000 gear revolutions. The reference value is dependent upon the maximum reservoir capacity and the displacement volume per stroke of the pump.

In step 120, the estimated lubricant level is calculated utilizing the stroke-count value and the reference value. As discussed above with regard to step 118, the reference value is the predicted upper limit of the stroke-count value. Lubricant-level estimator 40 calculates the estimated lubricant level based on the stroke-count value and the reference value. Lubricant-level estimator 40 can provide the estimated lubricant level in any desired form, such as a percent of lubricant remaining in lubricant reservoir 26, a percent of lubricant dispersed from lubricant reservoir 26, a number of pump strokes remaining until lubricant reservoir 26 is empty, a number of lubrication cycles remaining until lubricant reservoir 26 is empty, a volume of lubricant remaining in lubricant reservoir 26, and a volume of lubricant dispersed from lubricant reservoir 26, among others.

In step 122, lubricant-level estimator 40 provides a display signal to a notification device, such as notification device 22 (shown in FIG. 1), with the display signal communicating the estimated lubricant level to notification device 22. Notification device 22 then displays or otherwise alerts the user of the estimated lubricant level. Lubricant-level estimator 40 is configured to continuously provide the estimated lubrication level.

In step 112 of FIG. 3B, lubricant-level estimator 40 monitors the reservoir assembly for a signal. If the signal received is a reservoir-full signal, then lubricant-level estimator 40 proceeds through the count reset routine. In step 124, lubricant-level estimator 40 asks if a reservoir-full signal has been received. If the answer is NO, then lubricant-level estimator 40 proceeds back to step 112 and continues to monitor the reservoir assembly for a signal. Because no reservoir-full signal has been received by lubricant-level estimator 40, lubricant reservoir 26 has not been refilled and lubricant-level estimator 40 continues to estimate the lubricant level for the current estimation cycle.

If the answer in step 124 is YES, then lubricant-level estimator 40 is informed by the reservoir-full signal that lubricant reservoir 26 has been refilled with lubricant. The reservoir-full signal indicates that the actual lubricant level in lubricant reservoir 26 is at the maximum reservoir capacity. The reservoir-full signal is generated by high-level sensor 14 (shown in FIGS. 1-2B). High-level sensor 14 senses when the actual lubricant level in lubricant reservoir 26 reaches the reservoir-full level as lubricant reservoir 26 is being refilled. High-level sensor 14 generates the reservoir-full signal and provides the reservoir-full signal to lubricant-level estimator 40 to inform lubricant-level estimator 40 that the actual lubricant level is at the reservoir-full level.

In step 126, lubricant-level estimator 40 resets the stroke-count value to zero in response to the reservoir-full signal. Resetting the stroke-count value to zero also resets the estimated lubricant level to the maximum reservoir capacity. In this way, the estimated lubricant level matches the actual lubricant level at the beginning of a given estimation cycle because the current count is zero, which indicates that no pump strokes have yet taken place, and thus no lubricant has been displaced from the reservoir. Lubricant-level estimator 40 is thus reset to estimate the lubricant level for a new estimation cycle. Lubricant-level estimator 40 then proceeds back to step 112 and continues to monitor the reservoir assembly for a count signal, to provide an estimated lubricant level through the next estimation cycle.

In step 112 of FIG. 3C, lubricant-level estimator monitors the reservoir assembly for a signal. If the signal received is a low-level signal, then lubricant-level monitor 40 proceeds with the adjustment routine. Steps 128-132 are an adjustment process whereby lubricant-level estimator 40 is adjusted to provide a more-accurate estimated lubricant level based on the actual displacement volume per pump stroke for the pump utilized in the lubrication system. In step 128, lubricant-level estimator asks if a low-level signal has been received. If the answer in step 128 is NO, then lubricant-level estimator 40 proceeds back to step 112 and continues to monitor the reservoir assembly for a signal. Because no low-level signal has been received by lubricant-level estimator 40, lubricant-level estimator can continue to estimate the estimated lubricant level with the adjusted reference value.

If the answer in step 128 is YES, then lubricant-level estimator 40 is informed by the low-level signal that the actual lubricant level in lubricant reservoir 26 has dropped from the reservoir-full level to a predetermined low level. The low-level signal is preferably generated by a low-level sensor, such as low-level sensor 30 (shown in FIG. 1), and the low-level signal is provided to lubricant-level estimator 40. The low-level sensor is configured to sense when an actual lubricant level in a reservoir has reached the predetermined low level. When the actual lubricant level reaches the predetermined low level, low-level sensor 30 generates the low-level signal and the low-level signal is communicated to lubricant-level estimator 40.

In step 130, a true count is generated. Lubricant-level estimator 40 saves the stroke-count value at the time the low-level signal is received as the true count. The true count represents the number of pump strokes required to drop the actual lubricant level in lubricant reservoir 26 from the reservoir-full level to the predetermined low level as determined from a previous estimation cycle. Because the lubricant reservoir volume and the predetermined level are both known, the volume of lubricant that must be displaced for the actual lubricant level to reach the predetermined level is known. The actual displacement volume per pump stroke is calculated from the true count by dividing the total volume of lubricant required to drop the actual lubricant level in lubricant reservoir 26 from the reservoir-full level to the predetermined level by the true count. As such, an actual displacement volume for each pump stroke can be calculated based on the volume of lubricant dispensed to reach the predetermined level and the true count.

In step 132, the reference value is adjusted based on the true count to generate an adjusted reference value. The adjusted reference value is calculated by replacing the assumed displacement volume per pump stroke with the actual displacement volume per pump stroke, calculated from the true count, and dividing the maximum reservoir capacity by the actual displacement volume. Dividing the maximum reservoir capacity by the actual displacement volume per pump stroke gives the predicted number of pump strokes required to empty lubricant reservoir 26, where each pump stroke displaces the actual displacement volume per pump stroke as calculated from the true count. The adjusted reference value is stored in memory 44 where the adjusted reference value can be utilized in subsequent estimation cycles. For example, the adjusted reference value is recalled from the memory in step 118 of FIG. 3A, and the adjusted reference value is utilized in the estimation routine. In this way, the adjusted reference value represents a modified upper limit of the stroke-count value, where the modified upper limit is based on each pump stroke displacing the actual displacement volume calculated from the true count.

The lubricant-level estimator 40 then proceeds back to step 112 and lubricant-level estimator is ready to estimate the estimated lubricant level across another estimation cycle. Because the adjusted reference value is based on the actual displacement volume as calculated from the true count for a previous estimation cycle, the estimated lubricant level calculated utilizing the adjusted reference value more closely tracks the actual lubricant level. Lubricant-level estimator 40 thus provides a more accurate estimated lubricant level because the adjusted reference value is based on previous estimation cycles of lubrication system 10.

Although the present invention has been described with reference to preferred embodiments, workers skilled in the art will recognize that changes may be made in form and detail without departing from the spirit and scope of the invention.

The invention claimed is:

1. A lubricant level sensing system comprising:
   a reservoir assembly comprising:
      a reservoir having a reservoir volume and configured to store a reservoir volume of lubricant;
      a pump assembly configured to displace lubricant from the reservoir with a plurality of pump strokes; and
      a displacement sensor disposed in the pump assembly, wherein the displacement sensor is configured to sense displacement of a component within the pump assembly and to produce a count signal based on the displacement of the component;
   a high-level sensor disposed on the reservoir, wherein the high-level sensor produces a reservoir-full signal based on an actual lubricant level being at a reservoir-full level; and
   a lubricant-level estimator configured to estimate an estimated lubricant level in the reservoir, the lubricant-level estimator comprising:
      a processor; and
      a memory encoded with instructions that, when executed by the processor, cause the processor to generate a stroke-count value based on the count signal received from the displacement sensor, the stroke-count value being a count of the number of pump strokes for an estimation cycle, to recall a reference value from the memory, the reference value being a predicted number of pump strokes required to displace the reservoir volume of lubricant and based on an expected volume of lubricant delivered with each pump stroke, and to estimate the estimated lubricant level based on a comparison of the stroke-count value and the reference value.

2. The lubricant level sensing system of claim 1, wherein the expected volume of lubricant delivered with each pump stroke is an assumed displacement volume per pump stroke for an ideal pump, such that the reference value comprises a theoretical reference value, the theoretical reference value being a predicted number of pump strokes required to displace the reservoir volume of lubricant with each pump stroke delivering the assumed displacement volume per pump stroke for an ideal pump.

3. The lubricant level sensing system of claim 1, further comprising:
   a low-level sensor disposed on the reservoir, wherein the low-level sensor senses the actual lubricant level reaching a predetermined low level, produces a low-level signal in response to the actual lubricant level reaching the predetermined low level, and provides the low-level signal to the lubricant-level estimator.

4. The lubricant level sensing system of claim 3:
   wherein the lubricant-level estimator determines a true count, the true count being a number of pump strokes required to disperse a volume of lubricant required to drop the actual lubricant level from the reservoir-full level sensed by the high-level sensor to the predetermined low level sensed by the low-level sensor;
   wherein the lubricant-level estimator determines an actual displacement volume per pump stroke based on the true count; and
   wherein the expected volume of lubricant delivered with each pump stroke is the actual displacement volume per pump stroke, such that the reference value is an adjusted reference value, the adjusted reference value being a predicted number of pump strokes required to displace the reservoir volume of lubricant with each pump stroke delivering the actual displacement volume per pump stroke.

5. The lubricant level sensing system of claim 1, wherein the lubricant level is at least one of a volume of lubricant in the reservoir, a number of pump strokes remaining until the reservoir requires refilling, and a percentage of the reservoir volume filled with lubricant.

6. The lubricant level sensing system of claim 1, wherein the pump assembly comprises:
   a pump fluidly connected to the reservoir and configured to displace the lubricant from the reservoir; and
   a motor attached to the pump through a drive gear.

7. The lubricant level sensing system of claim 6, wherein the component is the drive gear and the displacement sensor is configured to sense a revolution of the drive gear and to generate the count signal in response to the revolution of the drive gear.

8. The lubricant level sensing system of claim 1, wherein the high-level sensor comprises:
   an autofill shutoff valve disposed on the reservoir, wherein the autofill shutoff valve is movable between an open position and a closed position, and wherein the reservoir-full signal is generated by the autofill shutoff valve being in the closed position.

9. The lubricant level sensing system of claim 8, wherein the autofill shutoff valve comprises:
   a valve body mounted on the reservoir;
   a refill flowpath extending through the valve body between a lubricant inlet and a lubricant outlet;
   a valve element disposed at least partially within the valve body and movable between the open position and the closed position, wherein the valve element includes a first end extending into the reservoir, a sealing element disposed in the refill flowpath, and a second end disposed opposite the first end, wherein the sealing element prevents lubricant from flowing through the refill flowpath when the valve element is in the closed position; and
   a signal switch disposed proximate the valve element, the signal switch configured to produce the reservoir-full signal in response to the valve element shifting to the closed position.

10. The lubricant level sensing system of claim 1, and further comprising:
    a notification device communicating with the lubricant-level estimator, the notification device configured to receive a display signal from the lubricant-level estimator and to output a notification regarding the estimated lubricant level.

11. The lubricant level sensing system of claim 10, wherein the notification is one of a visual notification and an audio notification.

12. The lubricant level sensing system of claim 1, wherein the estimation cycle includes a plurality of lubrication cycles.

13. A method of estimating a lubricant level in a reservoir across an estimation cycle, the method comprising:
    monitoring a reservoir assembly for a count signal from a displacement sensor configured to sense displacement of a component within a pump assembly and to produce the count signal based on the displacement of the component;
    generating a stroke-count value based on the count signal, wherein the stroke-count value is a count of a number of pump strokes sensed by the displacement sensor during the estimation cycle;

recalling a reference value from a computer memory, wherein the reference value is a predicted number of pump strokes required to displace a reservoir volume of lubricant, the reference value based on an expected volume of lubricant delivered with each pump stroke;

calculating an estimated lubricant level based on a comparison of the stroke-count value and the reference value; and resetting the stroke-count value to a zero count based on a reservoir-full signal received from a high-level sensor.

14. The method of claim 13, wherein the high-level sensor comprises an autofill shutoff valve, and wherein the autofill shutoff valve produces the reservoir-full signal when the autofill shutoff valve is in a closed position.

15. The method of claim 13, further comprising:
providing the estimated lubricant level to a notification device; and
displaying the estimated lubricant level with the notification device.

16. The method of claim 13, further comprising:
sensing when an actual lubricant level reaches a predetermined low level with a low-level sensor, the low-level sensor generating a low-level signal based on the actual lubricant level being at the predetermined low level;
generating a true count in response to the low-level signal, the true count being a number of pump strokes required to disperse a volume of lubricant required to drop the actual lubricant level from the reservoir-full level sensed by the high-level sensor to the predetermined low level sensed by the low-level sensor;
calculating an actual displacement volume per pump stroke by dividing the volume of lubricant required to drop the actual lubricant level from the reservoir-full level sensed by the high-level sensor to the predetermined low level sensed by the low-level sensor by the true count; and
adjusting the reference value to an adjusted reference value, the adjusted reference value being a predicted number of pump strokes required to displace the reservoir volume of lubricant based upon each pump stroke delivering the actual displacement volume per pump stroke.

17. The method of claim 13 wherein the step of generating a stroke-count value based on the count signal comprises:
monitoring a drive gear of a motor;
sensing rotation of the drive gear; and
generating the count signal in response to the rotation of the drive gear.

18. A lubricant-level estimator comprising:
a processor; and
a memory encoded with instructions that, when executed by the processor, cause the processor to generate a stroke-count value based on a count signal received from a displacement sensor, the stroke-count value being a count of a number of pump strokes for an estimation cycle, to recall a reference value from the memory, the reference value being a predicted number of pump strokes required to displace a reservoir volume of lubricant, and to estimate an estimated lubricant level based on a comparison of the stroke-count value and the reference value, and wherein the reference value is based on an expected volume of lubricant delivered with each pump stroke.

19. The lubricant-level estimator of claim 18:
wherein the lubricant-level estimator determines a true count, the true count being a number of pump strokes required to disperse a volume of lubricant required to drop the actual lubricant level from the reservoir-full level sensed by a high-level sensor to the predetermined low level sensed by a low-level sensor;
wherein the lubricant-level estimator determines an actual displacement volume per pump stroke based on the true count; and
wherein the reference value is an adjusted reference value, the adjusted reference value being a predicted number of pump strokes required to displace the reservoir volume of lubricant based upon each pump stroke delivering the actual displacement volume per pump stroke.

20. The lubricant-level estimator of claim 18, wherein the wherein the reference value comprises a theoretical reference value, the theoretical reference value being a predicted number of pump strokes required to displace a reservoir volume of lubricant based upon each pump stroke delivering an assumed displacement volume per pump stroke, the assumed displacement volume per pump stroke being the displacement volume per pump stroke of an ideal pump.

* * * * *